(12) United States Patent
Jung et al.

(10) Patent No.: US 12,379,876 B2
(45) Date of Patent: Aug. 5, 2025

(54) STORAGE DEVICES AND OPERATING METHODS THEREOF

(71) Applicant: Samsung Electronics Co., Ltd., Suwon-si (KR)

(72) Inventors: Byungsue Jung, Suwon-si (KR); Kyungduk Lee, Suwon-si (KR); Jaeik Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/485,395

(22) Filed: Oct. 12, 2023

(65) Prior Publication Data

US 2024/0231698 A1 Jul. 11, 2024

(30) Foreign Application Priority Data

Jan. 6, 2023 (KR) ........................ 10-2023-0002517

(51) Int. Cl.
*G06F 3/06* (2006.01)

(52) U.S. Cl.
CPC .......... *G06F 3/0659* (2013.01); *G06F 3/0607* (2013.01); *G06F 3/0679* (2013.01)

(58) Field of Classification Search
CPC .... G06F 3/0607; G06F 3/0611; G06F 3/0659; G06F 3/0679; G06F 12/0238; G06F 13/1668; G06F 13/18; G06F 13/4221; G06F 13/4265; G06F 2212/1024; G06F 2212/202; G06F 2212/7204; G06F 2213/0026
See application file for complete search history.

(56) References Cited

U.S. PATENT DOCUMENTS

| | | |
|---|---|---|
| 8,433,858 B1 | 4/2013 | Diggs et al. |
| 8,996,781 B2 | 3/2015 | Schuette et al. |
| 9,195,410 B2 | 11/2015 | Mizuno |
| 9,268,495 B2 | 2/2016 | Vogan |
| 9,535,838 B2 | 1/2017 | Ajanovic et al. |
| 10,216,419 B2 | 2/2019 | De |
| 10,573,054 B2 | 2/2020 | Herr et al. |

(Continued)

FOREIGN PATENT DOCUMENTS

| | | |
|---|---|---|
| EP | 3608770 A1 | 2/2020 |
| EP | 4105771 A1 | 12/2022 |

OTHER PUBLICATIONS

Kim Seonbong et al: "Optimized I/O Determinism for Emerging NVM-based NVMe SSD in an Enterprise System", 2018 55TH ACM/ESDA/IEEE Design Automation Conference (DAC), IEEE, Jun. 24, 2018 (Jun. 24, 2018).

(Continued)

*Primary Examiner* — Aracelis Ruiz
(74) *Attorney, Agent, or Firm* — Myers Bigel, P.A.

(57) ABSTRACT

A operating method of a storage device including a nonvolatile memory, where the method may include: receiving a first packet including a read command for the nonvolatile memory from a host according to a first protocol; acquiring first requester information corresponding to an identifier (ID) of the host by parsing the first packet; determining resource priorities based on first requester information; reading data stored in the nonvolatile memory by using resources of the storage device according to the resource priorities; and transmitting the data to the host.

16 Claims, 16 Drawing Sheets

(56) References Cited

U.S. PATENT DOCUMENTS

| | | | |
|---|---|---|---|
| 10,606,516 B2 | 3/2020 | Subraya | |
| 11,372,794 B2 | 6/2022 | Ahn | |
| 2016/0283152 A1* | 9/2016 | Allen | G06F 3/0619 |
| 2020/0050403 A1* | 2/2020 | Suri | G06F 3/0679 |

OTHER PUBLICATIONS

"Extended European Search Report dated Mar. 7, 2024, issued in corresponding European Application No. 2304462, 11 pgs.".

* cited by examiner

FIG. 4A

| PCIe REQUESTER ID | REQUESTER |
|---|---|
| ID0 | CPU1 |
| ID1 | GPU1 |
| ID2 | GPU1 |
| ID3 | CPU2 |
| ... | ... |

FIG. 4B

| PCIe REQUESTER ID | REQUESTER |
|---|---|
| ID0 | CPU1_1 |
| ID1 | CPU1_2 |
| ID2 | CPU1_3 |
| ID3 | CPU1_4 |
| ID4 | GPU1 |
| ID5 | GPU2 |
| ... | ... |

STORAGE DEVICES AND OPERATING METHODS THEREOF

CROSS-REFERENCE TO RELATED APPLICATION

This application is based on and claims priority under 35 U.S.C. § 119 to Korean Patent Application No. 10-2023-0002517, filed on Jan. 6, 2023, in the Korean Intellectual Property Office, and the entire contents of the above-identified application are incorporated by reference herein.

TECHNICAL FIELD

The present disclosure relates to storage devices, and more particularly, to storage devices in which resource priorities may be adjusted according to a host, and operating methods thereof.

BACKGROUND

The representative example of a flash memory-based large capacity storage device is a solid state drive (SSD). With an explosive increase in demand for SSDs, uses thereof are variously differentiated.

An SSD may communicate according to a PCIe protocol. The PCIe protocol may refer to a communication standard for connecting an SSD and a requester, such as a Central Processing Unit (CPU), to each other.

When an SSD receives a read command from a plurality of requesters, a specific requester may require a quick response. Thus, a method of providing a quick response to a requester requiring a quick response is increasingly desirable.

SUMMARY

The inventive concepts provides storage devices in which resource priorities may be adjusted according to a host, and operating methods thereof.

According to some embodiments, there is provided an operating method of a storage device, the operating method including receiving a first packet including a read command for the nonvolatile memory from a host according to a first protocol, acquiring first requester information corresponding to a host identifier of the host by parsing the first packet, determining resource priorities based on first requester information, reading data stored in the nonvolatile memory by using resources of the storage device according to the resource priorities, and transmitting the data to the host.

According to some embodiments, there is provided a storage device including a nonvolatile memory in which data is stored, and a memory controller configured to control the nonvolatile memory, wherein the memory controller may include a media access module configured to transmit/receive data to/from the nonvolatile memory, a first protocol layer configured to receive a first packet including a read command for the nonvolatile memory from a host and to acquire first requester information corresponding to a host identifier of the host by parsing the first packet, a requester manager configured to determine resource priorities based on first requester information, and a command processing module configured to control a media access module to read the data stored in the nonvolatile memory by using resources of the storage device according to the resource priorities.

According to some embodiments, there is provided a host-storage system including a host configured to generate a first packet including a read command according to a first protocol, and a storage device configured to receive the first packet from the host, to acquire first requester information corresponding to a host identifier of the host by parsing the first packet, to determine resource priorities based on the first requester information, to read data by using resources according to the resource priorities and to transmit the data to the host.

BRIEF DESCRIPTION OF THE DRAWINGS

Embodiments will be more clearly understood from the following detailed description taken in conjunction with the accompanying drawings in which:

FIGS. 4A and 4B are views for describing a PCIe data packet according to some example embodiments;

DETAILED DESCRIPTION OF THE EMBODIMENTS

Hereinafter, some example embodiments of the inventive concepts will be described in detail with reference to the accompanying drawings.

Figure 1:
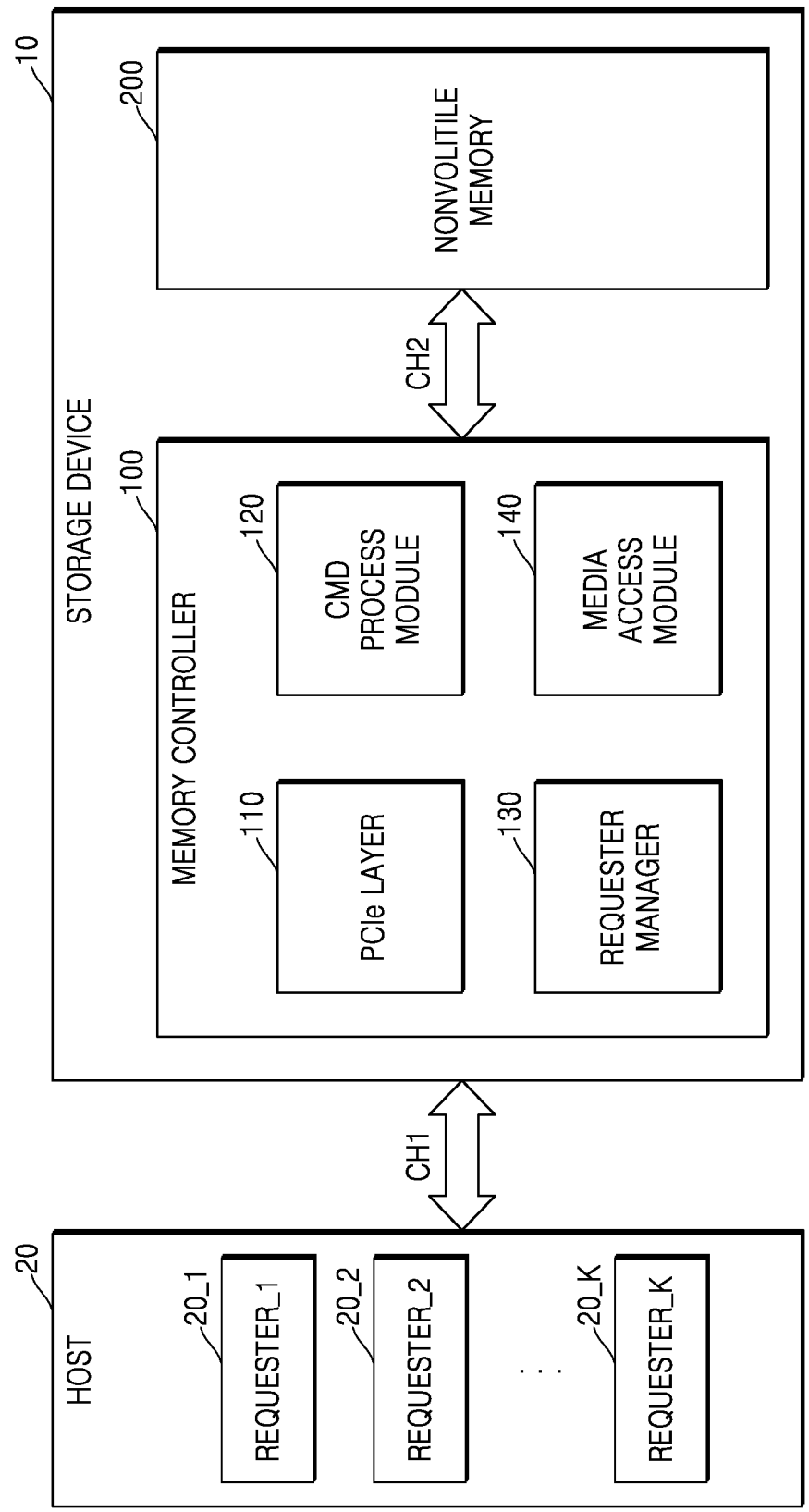
FIG. 1 is a block diagram for describing a host-storage system according to some example embodiments.

FIG. 1 is a block diagram for describing a host-storage system according to some example embodiments.

The host-storage system may be implemented, for example, as a personal computer (PC), a data server, a network-coupled storage, an Internet of Things (IoT) device, or a portable electronic device. The portable electronic device may be a laptop computer, a mobile phone, a smartphone, a tablet PC, a personal digital assistant (PDA), an enterprise digital assistant (EDA), a digital still camera, a digital video camera, an audio device, a portable multimedia player (PMP), a personal navigation device (PND), an MP3 player, a handheld game console, an e-book, a wearable device, or the like.

Referring to FIG. 1, the host-storage system may include a storage device 10 and a host 20. The host 20 may communicate with the storage device 10 via a first channel CH1. The first channel CH1 may be a channel that follows a Peripheral Component Interconnection express (PCIe) protocol. However, the present disclosure and the inventive concepts thereof are not limited thereto, and the first channel CH1 may be a channel that follows one or more of various protocols, such as Nonvolatile Memory Express (MAE), Peripheral Component Interconnection (PCI), Universal Flash Storage Security (UFS), Advanced Connect Technology Attachment (ATA), Serial Read-ATA, and/or the like.

The host 20 may include first to K-th requesters 20_1 to 20_K (where K is a natural number that is greater than or equal to 2). Each of the first to K-th requesters 20_1 to 20_K may refer to an arbitrary device that generates or is configured to generate a read command for a nonvolatile memory 200. For example, the first requester 20_1 may be a Central Processing Unit (CPU), and the second requester 202 may be a Graphics Processing Unit (GPU). In the present disclosure, for convenience of explanation, the host 20 may be used as a collective term referring to two or more requesters among the first to K-th requesters 20_1 to 20_K.

The storage device 10 may include the memory controller 100 and the nonvolatile memory 200, and the memory controller 100 may communicate with the nonvolatile memory 200 via a second channel CH2. The second channel CH2 may be a channel that follows various protocols, like the first channel CH1.

The memory controller 100 may perform a control operation to write data into the nonvolatile memory 200 and/or read the stored data from the nonvolatile memory 200. The memory controller 100 may perform the control operation in response to various requests from the host 20. For example, the memory controller 100 may control data writing and reading operations into/from the nonvolatile memory 200 or may control an erase operation of erasing the data stored in the nonvolatile memory 200.

The memory controller 100 may perform a control operation of the nonvolatile memory 200 based on various units. In an example, a memory block may be an erase unit, and a page may be a writing unit and a reading unit. The memory controller 100 may provide a command/address CMD/ADD to the nonvolatile memory 200 so as to perform various requests from the host 20.

The memory controller 100 may include a PCIe layer 110, a CMD process module 120, a requester manager 130, and a media access module 140. Each of the PCIe layer 110, the CMD process module 120, the requester manager 130, and the media access module 140 may be implemented with hardware or software or a combination of hardware and software.

The PCIe layer 110 may receive a PCIe packet including a read command for the nonvolatile memory 200 from the host 20. In the present disclosure, the PCIe packet may refer to a data block formatted according to the PCIe protocol. The PCIe layer 110 may receive the PCIe packet through the first channel CH1. The PCIe layer 110 may parse the PCIe packet to acquire PCIe requester information. The PCIe requester information may refer to information corresponding to an identifier (ID) of a requester that generates the read command. For example, the PCIe requester information may refer to a PCIe requester ID of the requester that generates the read command.

The CMD process module 120 may control the media access module 140 so as to read data stored in the nonvolatile memory 200 by using resources of the storage device 10 according to resource priorities. Hereinafter, resource priorities or priorities may be used to refer to priorities relating to resource allocation of the storage device 10 for processing the read command included in the PCIe packet.

In the present disclosure, the resources of the storage device 10 may refer to hardware or software components such as a cache, a processor or the like for processing the read command. For example, the resources of the storage device 10 may refer to a cache or a processor of the CMD process module 120. When the CMD process module 120 increases the amount of resources used for the read command, the time required for read command processing may be reduced. However, the resources of the storage device 10 may be finite and/or may be a limited amount. Thus, when the CMD process module 120 processes read commands generated from the plurality of requesters, that is, from the first to K-th requesters 20_1 to 20_K, the resources used for each read command processing may need to be adjusted.

The requester manager 130 may determine resource priorities of read command processing based on the PCIe requester information received from the PCIe layer 110.

In some embodiments, the requester manager 130 may determine resource priorities according to a read command frequency corresponding to the PCIe requester ID. Specifically, the requester manager 130 may determine resource priorities as a special priority when the read command frequency corresponding to the PCIe requester ID is greater than or equal to a threshold level. On the other hand, the requester manager 130 may determine resource priorities as a normal priority when the read command frequency corresponding to the PCIe requester ID is less than the threshold level.

Herein, the term "special priority" may refer to a higher priority than the normal priority. The requester manager 130 may provide a resource priority signal to the CMD process module 120. The CMD process module 120 may process the read command by using the resources of the storage device 10 according to the resource priority signal. For example, when the CMD process module 120 receives the special priority signal corresponding to the special priority from the requester manager 130, the amount of resources used for processing the read command may be increased compared to the case where the normal priority signal is received. The CMD process module 120 may process the read command by controlling the media access module 140 to read the data stored in the nonvolatile memory 200.

In some embodiments, the PCIe layer 110 may receive a second PCIe packet subsequent to the first PCIe packet. The PCIe layer 110 may parse the first PCIe packet and the second PCIe packet to acquire first PCIe requester information and second PCIe requester information, respectively. The requester manager 130 may determine that the second resource priority corresponding to the second PCIe packet is higher than the first resource priority corresponding to the first PCIe packet. In other words, the priority of a requester corresponding to a later received PCIe packet among the first to K-th requesters 20_1 to 20_K may be determined as a higher priority. However, this is only an example, and according to some example embodiments, the requester manager 130 may determine that the first resource priority corresponding to the first PCIe packet is higher than the second resource priority corresponding to the second PCIe packet according to some example embodiments.

In some embodiments, the CMD process module 120 may acquire Non Volatile Memory Express (NVMe) requester information including an NVMe ID corresponding to an ID of the host 20 and a requester type corresponding to the type of the host 20 according to an NVMe protocol, based on the PCIe packet. In other words, the PCIe packet may include NVMe requester information according to the NVMe protocol. The requester manager 130 may determine resource priorities based on the NVMe requester information. For example, the requester manager 130 may determine different ones of the first to K-th requesters 20_1 to 20_K to have different resource priorities according to the requester type. However, this is just an example, the requester manager 130 may determine to have the same resource priority for all requester types.

The requester types may be a CPU, a GPU, a Local Area Network (LAN) card, a Network Interface Card (NIC), and/or the like. However, this is just an example, and the requester type may refer to the type of arbitrary devices for generating the read command for the nonvolatile memory 200.

In some embodiments, the NVMe requester information may further include priority information. The requester manager 130 may determine resource priorities according to the priority information. In other words, the host 20 may designate resource priorities used for processing a read command by generating a PCIe packet including priority information. When receiving a plurality of other PCIe packets having the same priority information from the host 20, the requester manager 130 may determine the priority of the requester corresponding to the later received PCIe packet as a higher priority. However, this is just an example, and the requester manager 130 may determine the priority of the requester corresponding to the first received PCIe packet as a higher priority according to some embodiments.

In some embodiments, the requester manager 130 may determine resource priorities according to a read command frequency corresponding to the requester type. For example, in the case where, for example, the NVMe requester information does not include priority information, that is, when the host 20 does not designate resource priorities, the requester manager 130 may determine resource priorities according to a read command frequency corresponding to the requester type. Specifically, the requester manager 130 may determine resource priorities as a special priority when the read command frequency corresponding to the requester type is greater than or equal to a threshold level. On the other hand, the requester manager 130 may determine resource priorities as a normal priority when the read command frequency corresponding to the requester type is less than the threshold level.

The media access module 140 may be configured to transmit/receive data to/from the nonvolatile memory 200 through the second channel CH2.

The nonvolatile memory 200 may include a nonvolatile memory, such as NAND flash memory, vertical NAND flash memory, NOR flash memory, resistive Random Access Memory (RAM), phase-change memory, and magnetoresistive RAM.

The nonvolatile memory 200 may include a memory cell array (MCA), and the MCA may include a plurality of memory blocks. Also, each memory block may include a plurality of word lines and one or more dummy word lines. For example, memory cells respectively connected to word lines may constitute one page, user data may be stored in a page corresponding to a plurality of word lines, and data may not be stored in a page corresponding to one or more dummy word lines.

According to some example embodiments of the present disclosure as described above, resources of a storage device 10 used for processing a read command may be adjusted according to a resource priority. In addition, the time needed for processing the read command may be reduced by increasing the amount of resources when a read command of the host 20 having a special priority is processed, which may improve efficiency and/or speed in the host-storage system.

Figure 2:
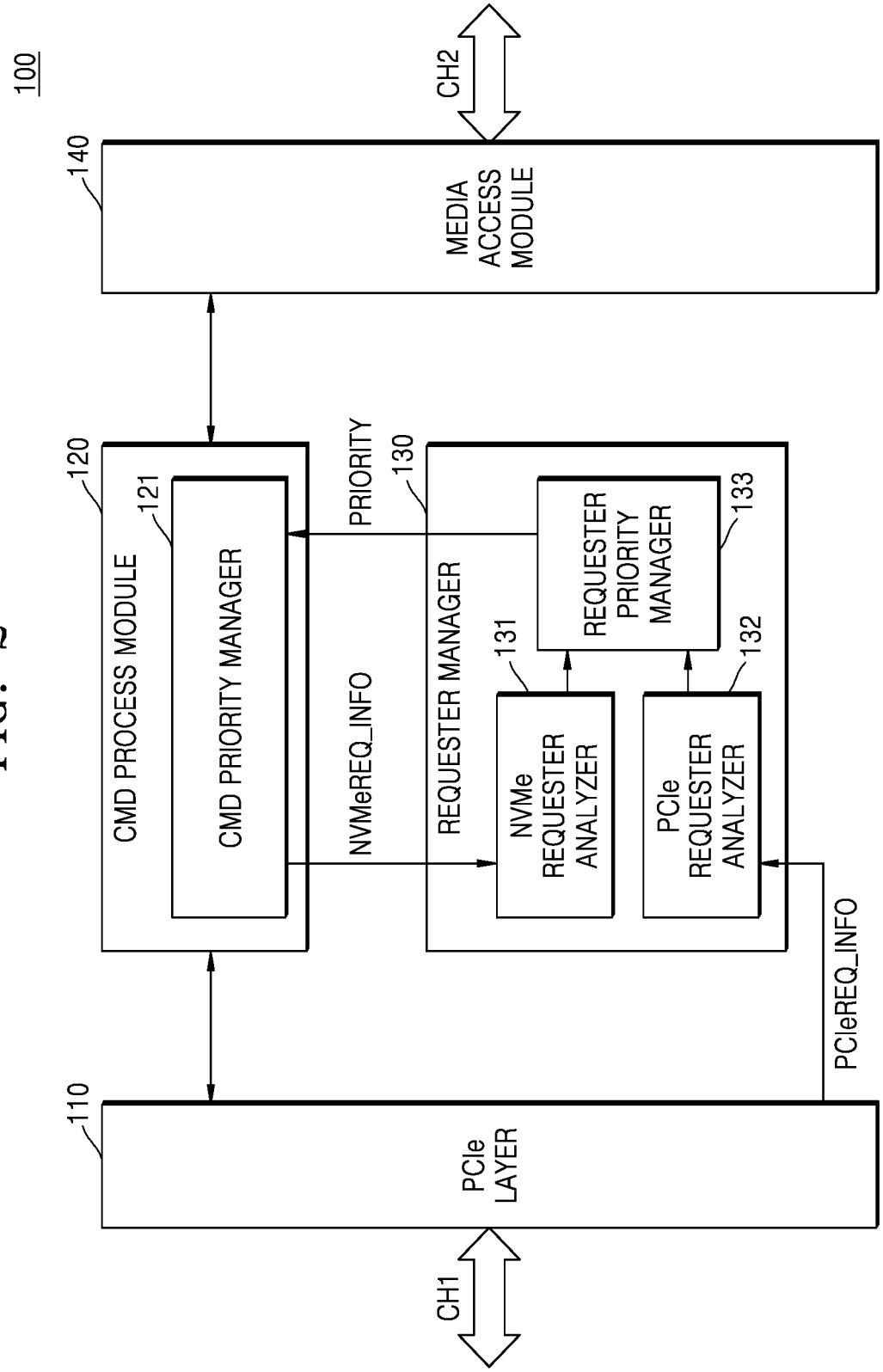
FIG. 2 is a block diagram for describing a memory controller according to some example embodiments.

FIG. 2 is a block diagram for describing a memory controller 100 according to some example embodiments.

The memory controller may include a PCIe layer 110, a CMD process module 120, a requester manager 130, and a media access module 140.

The PCIe layer 110 may communicate with the host 20 through the first channel CH1. The PCIe layer 110 may receive a PCIe packet including a read command for the nonvolatile memory 200 from the host 20 through the first channel CH1. The PCIe layer 110 may parse the PCIe packet to acquire PCIe requester information PCIeREQ_INFO. The PCIe requester information PCIeREQ_INFO may include a PCIe requester ID corresponding to an ID of the requester for generating the read command. The PCIe layer 110 may provide the PCIe requester information PCIeREQ_INFO to the requester manager 130. Also, the PCIe layer 110 may provide data acquired by parsing the PCIe packet to the CMD process module 120.

The CMD process module 120 may control the media access module 140 so as to read data stored in the nonvolatile memory 200 by using resources of the storage device 10 according to resource priorities.

The CMD process module 120 may include a command priority manager 121. The command priority manager 121 may acquire NVMe requester information NVMeREQ_INFO from data acquired by parsing the PCIe packet using the PCIe layer 110. In other words, the PCIe packet may include NVMe requester information NVMeREQ_INFO. The NVMe requester information NVMeREQ_INFO may include an NVMe ID corresponding to an ID of the host 20 and a requester type corresponding to the type of the host 20 according to an NVMe protocol. The command priority manager 121 may provide the NVMe requester information NVMeREQ_INFO to the requester manager 130. The requester manager 130 may determine resource priorities based on the NVMe requester information NVMeREQ_INFO.

In some example embodiments, the NVMe requester information NVMeREQ_INFO may further include priority information. The requester manager 130 may determine resource priorities according to the priority information. In other words, the host 20 may designate resource priorities used for processing a read command by generating a PCIe packet including priority information. When receiving requests from a plurality of requesters, i.e., a plurality of PCIe packets having the same priority information from the host 20, the requester manager 130 may determine the priority of the requester corresponding to the later received PCIe packet as a higher priority. However, this is just an example, and the requester manager 130 may determine the priority corresponding to the first received PCIe packet as a higher priority according to some embodiments.

The requester manager 130 may include a PCIe requester analyzer 132, an NVMe requester analyzer 131, and a requester priority manager 133.

The PCIe requester analyzer 132 may detect a read command frequency corresponding to the PCIe requester ID. The requester priority manager 133 may determine resource priorities according to the read command frequency. The requester priority manager 133 may determine resource priorities as a special priority when the read command frequency corresponding to the PCIe requester ID is greater than or equal to a threshold level. On the other hand, the requester priority manager 133 may determine resource priorities as a normal priority when the read command frequency corresponding to the PCIe requester ID is less than the threshold level.

The requester manager 130 may determine resource priorities of read command processing based on the PCIe requester information PCIeREQ_INFO received from the PCIe layer 110.

In some embodiments, the requester manager 130 may determine resource priorities according to the read command frequency corresponding to the PCIe requester ID. Specifically, the PCIe requester analyzer 132 may detect a read command frequency corresponding to the PCIe requester ID. The requester priority manager 133 may determine resource priorities as a special priority when the read command frequency corresponding to the PCIe requester ID is greater than or equal to a threshold level. On the other hand, the requester priority manager 133 may determine resource priorities as a normal priority when the read command frequency corresponding to the PCIe requester ID is less than the threshold level.

The requester priority manager 133 may provide a resource priority signal PRIORITY to the CMD process module 120. The resource priority signal PRIORITY may refer to a signal indicating resource priorities used for processing of the read command. Specifically, the resource priority signal PRIORITY may be a special priority signal or a normal priority signal. The CMD process module 120 may process the read command by using the resources of the storage device 10 according to the resource priority signal PRIORITY. For example, when the CMD process module 120 receives the special priority signal from the requester manager 130, the amount of resources used for processing the read command may be increased compared to the case in which the normal priority signal is received.

In some embodiments, the requester manager 130 may determine resource priorities according to a read command frequency corresponding to the requester type. For example, when the NVMe requester information NVMeREQ_INFO does not include priority information, the requester manager 130 may determine resource priorities according to the read command frequency corresponding to the request type. Specifically, the requester manager 130 may detect a read command frequency corresponding to the requester type. The requester priority manager 133 may determine resource priorities as a special priority when the read command frequency corresponding to the requester type is greater than or equal to a threshold level. On the other hand, the requester priority manager 133 may determine resource priorities as a normal priority when the read command frequency corresponding to the requester type is less than the threshold level. Thus, when the host 20 does not directly designate priority information, the requester manager 130 may determine resource priorities used for the read command processing by itself.

The CMD process module 120 may process the read command by controlling the media access module 140 to read the data stored in the nonvolatile memory 200.

The media access module 140 may be configured to transmit/receive data to/from the nonvolatile memory 200 through the second channel CH2.

Figure 3:
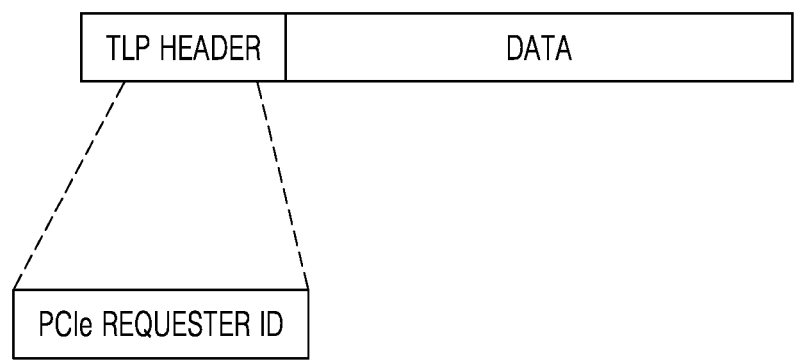
FIG. 3 is a view for describing a Peripheral Component Interconnection express (PCIe) data packet according to some example embodiments.

FIG. 3 is a view for describing a PCIe data packet according to some example embodiments.

The PCIe data packet may include a header, for example, a Transaction Layer Packet (TLP) header and data. Although only the TLP header and data are indicated in FIG. 3, the PCIe packet may further include a configuration for PCIe packet communication, such as End-to-End Cyclic Redundancy Code (ECRC), Data Link Layer, Physical Layer, and the like. The TLP header may include a PCIe requester ID. The PCIe requester ID may correspond to the ID of the host 20 according to the PCIe protocol. However, this is just an example, and the PCIe requester ID may be determined by using various methods of identifying a requester. The storage device 10 may identify the requester that has transmitted the PCIe packet through the PCIe requester ID.

FIGS. 4A and 4B are views for describing a PCIe data packet according to some example embodiments.

Referring to FIG. 4A, each of the requesters may have an inherent PCIe requester ID. The requester ID may refer to a pre-determined ID between the host 20 and the storage device 10 to identify the requester according to a protocol. For example, a first CPU CPU1 may have a PCIe requester ID of ID0, and a first GPU GPU1 may have a PCIe requester ID of ID1. However, this is just an example, and the PCIe requester ID may be determined using various methods of identifying a requester.

Referring to FIG. 4B, a multi-core processor may have different PCIe requester IDs for each core. For example, when the first CPU is a quad core processor, the first CPU may include first to fourth cores CPU1_1 to CPU1_4. The first to fourth cores may each have different PCIe requester IDs. Specifically, the first core CPU1_1 may have a PCIe requester ID of ID0, and the second core CPU1_2 may have a PCIe requester ID of ID1, the third core CPU1_3 may have a PCIe requester ID of ID2, and a fourth core CPU1_4 may have a PCIe request ID of ID3. However, this is just an example, and the PCIe requester ID may be determined by using various methods of identifying a core and a requester.

Figure 5A:
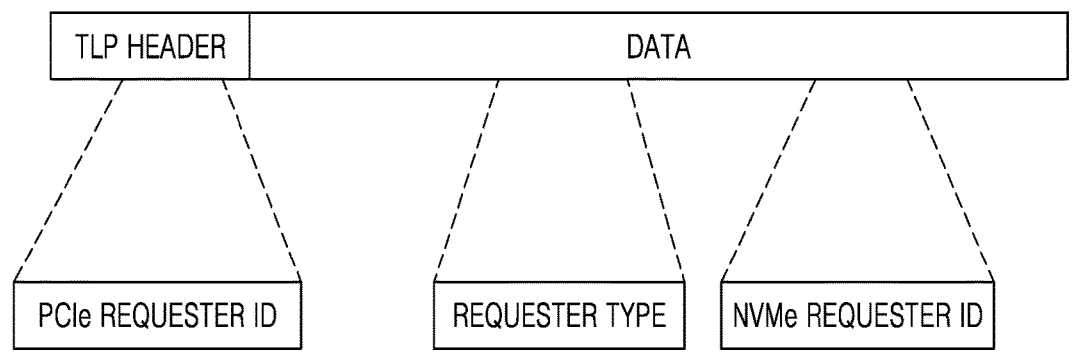
FIGS. 5A and 5B are views for describing a PCIe data packet according to some example embodiments.
Figure 5B:
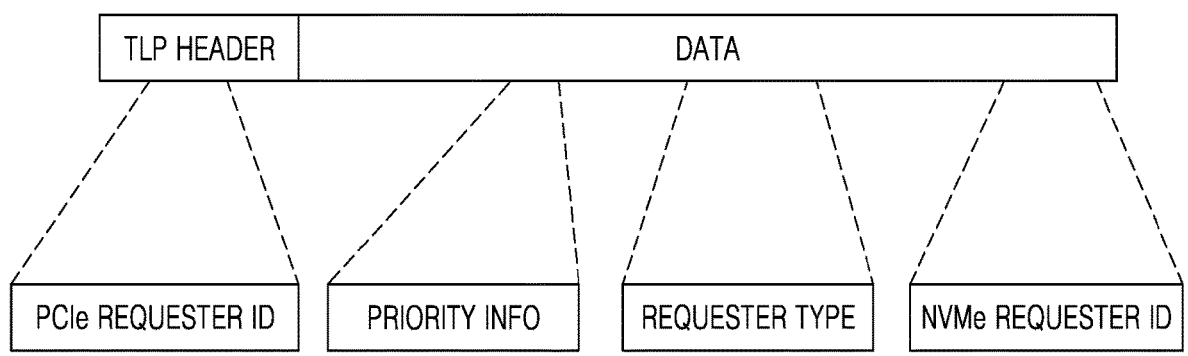

FIGS. 5A and 5B are views for describing a PCIe data packet according to some example embodiments.

Referring to FIG. 5A, the PCIe data packet may include a header, for example, a TLP header and data. As described above with reference to FIG. 3, the TLP header may include a PCIe requester ID.

The data may include a requester type. The requester type may refer to types of requesters for generating the read command, for example, a CPU, a GPU, and the like. The requester type may be used to determine resource priorities by using the storage device.

The data may further include an NVMe requester ID that follows an NVMe protocol. The NVMe requester ID may refer to an ID for identifying the requester according to the NVMe protocol. In some embodiments, the NVMe requester ID may be determined to be the same as the PCIe requester ID. However, this is just an example, and the NVMe requester ID may be determined using various methods of identifying a requester according to the NVMe protocol.

Referring to FIG. 5B, and in contrast to FIG. 5A, the data may further include priority information. The priority information may be used to designate a resource priority used for processing of the read command. For example, the host 20 may generate a PCIe packet by including the priority information corresponding to the special priority. Thus, the host 20 may receive a fast read response from the storage device 10 compared to when the priority information is not included.

Figure 6:
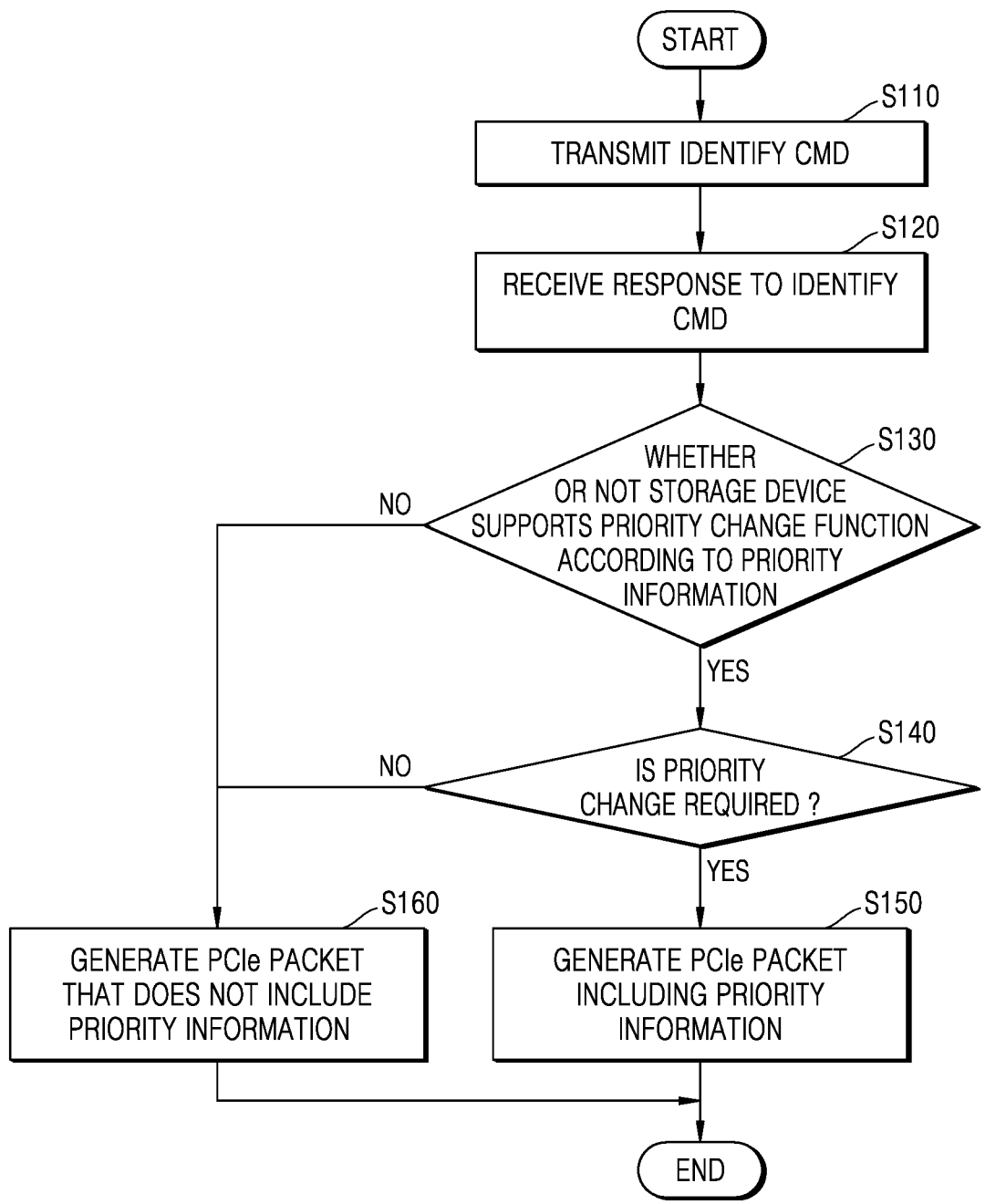
FIG. 6 is a view for describing an operating method of a host according to some example embodiments.

FIG. 6 is a view for describing an operating method of a host according to some example embodiments.

Referring to FIG. 6, the operating method of the host according to some example embodiments may include operations S110 to S160. For example, the operating method according to the present embodiment may include operations performed in time series in the host 20 of FIG. 1.

In operation S110, the host may transmit an identify command to a storage device. The identify command may refer to a command transmitted by the host so as to identify a function supported by the storage device. In some example embodiments, the identify command may be a command for identifying whether or not the storage device supports a priority changing function according to the priority information.

In operation S120, the host may receive a response to the identify command to the storage device. The host may receive an identify command response generated by the storage device in response to the identify command of operation S110. The identify command response may include information about a function supported by the storage device. For example, the identify command response may include information regarding whether or not the storage device supports the priority change function according to the priority information.

In operation S130, the host may check whether or not the storage device supports the priority change function according to the priority information. The host may check whether or not the storage device supports the priority change function according to the priority information by using a response to the identify command. When the storage device does not support the priority change function according to the priority information (NO branch from operation S130), operation S160 may be performed. On the other hand, when the storage device does support the priority change function according to the priority information (YES branch from operation S130), operation S140 may be performed.

In operation S140, the host may determine whether or not a priority change is required. Even though the storage device supports the priority change function according to priority information, a priority change may not be required according to some embodiments. When the host determines that the priority change is not necessary (NO branch from operation S140), operation S160 may be performed. On the other hand, when the host determines that the priority change is necessary (YES branch from operation S140), operation S150 may be performed.

In operation S150, the host may generate a PCIe packet including priority information. Referring to FIG. 5B, the host may generate a PCIe packet including priority information.

In operation S160, the host may generate a PCIe packet that does not include priority information. Referring to FIG. 5A, the host may generate a PCIe packet that does not include priority information.

The host may check whether or not the storage device supports a priority change function according to the priority information through operations S110 to S160, and may generate a PCIe packet including priority information according to a result of checking.

Figure 7:
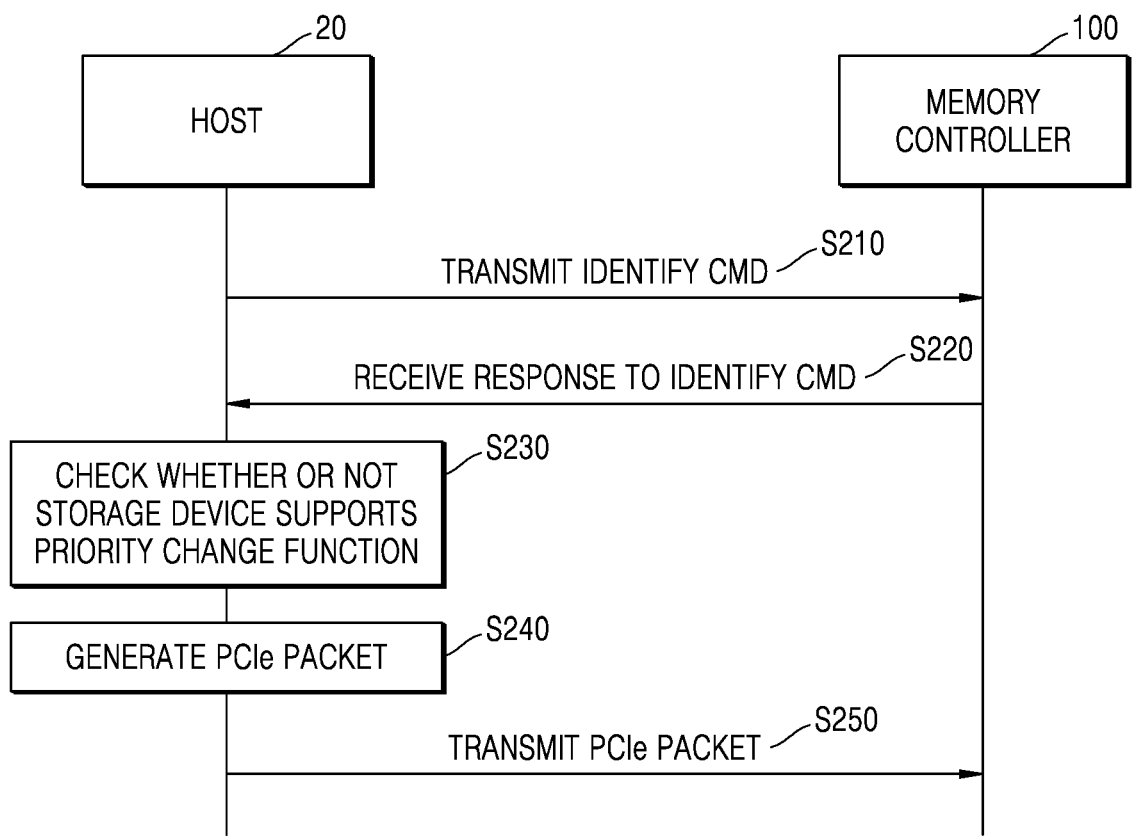
FIG. 7 is a signal exchange diagram between a host and a memory controller according to some example embodiments.

FIG. 7 is a signal exchange diagram between a host and a memory controller according to some example embodiments.

The signal exchange diagram of FIG. 7 may be described through an operation of the host 20 and the memory controller 100.

In operation S210, the host 20 may transmit an identify command to the memory controller 100.

In operation S220, the host 20 may receive a response to an identify command from the memory controller 100. The identify command response may include information regarding whether or not the storage device supports the priority change function according to the priority information.

In operation S230, the host 20 may check whether or not the storage device supports the priority change function. When the storage device supports a priority change function according to the priority information, the host 20 may determine whether or not the priority change is necessary.

In operation S240, the host 20 may generate a PCIe packet. The host 20 may generate a PCIe packet including the priority information when the priority change is necessary. On the other hand, when the priority change is not necessary or when the storage device does not support the priority change function according to the priority information, the host 20 may generate a PCIe packet that does not include priority information.

In operation S250, the host 20 may transmit the PCIe packet generated in operation S240 to the memory controller 100.

Figure 8:
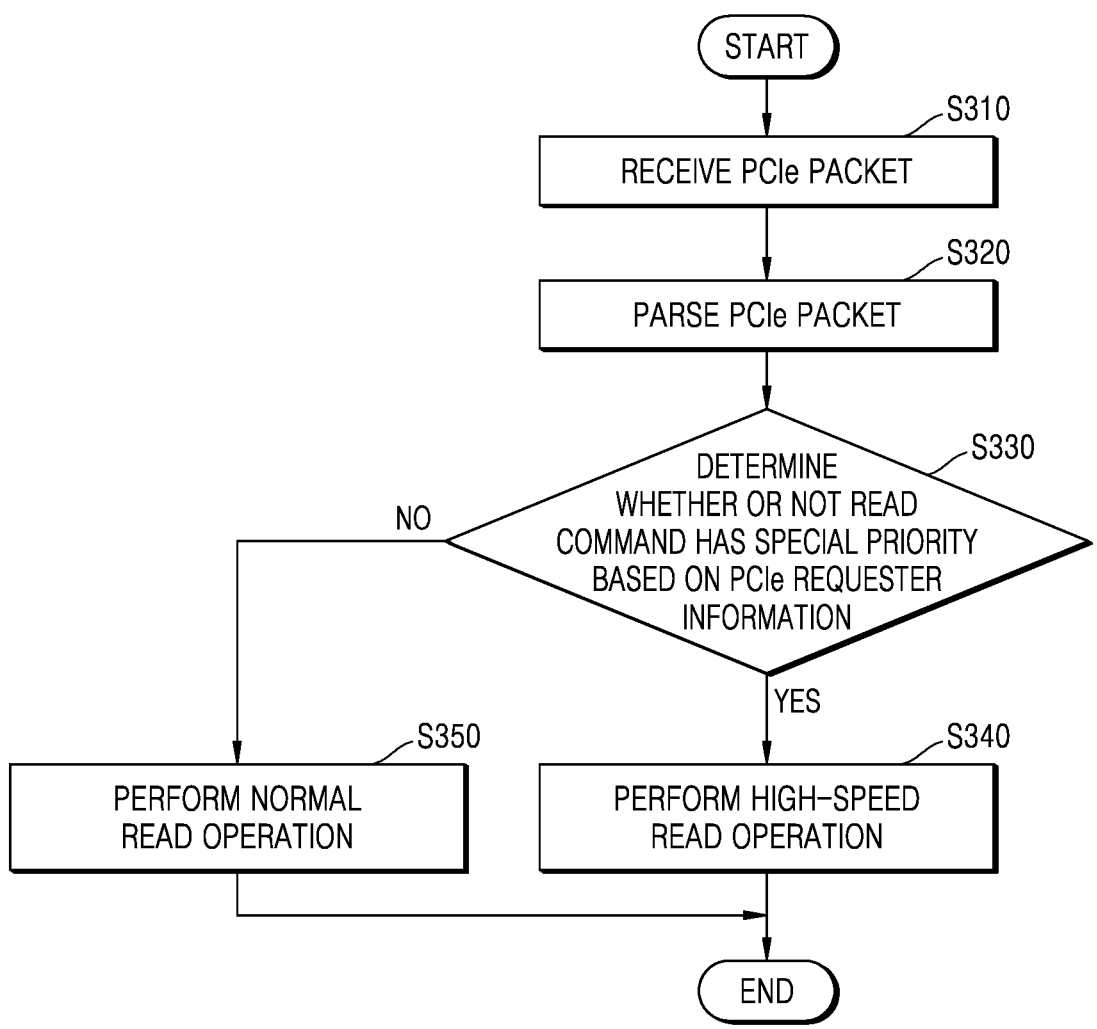
FIG. 8 is a view for describing an operating method of a storage device according to some example embodiments.

FIG. 8 is a view for describing an operating method of a storage device according to some example embodiments.

The operating method of the storage device may include operations S310 to S350. For example, the operating method according to the present embodiment may include operations performed in time series in the storage device 10 of FIG. 1. For example, operation S310 may be an operation that is performed after operation S250 of FIG. 7.

In operation S310, the storage device may receive a PCIe packet from a host. The storage device may receive the PCIe packet through a channel that follows the PCIe protocol.

In operation S320, the storage device may parse or decode the PCIe packet. The storage device may acquire PCIe requester information by parsing or decoding the PCIe packet. The PCIe requester information may include a PCIe requester ID, for example.

In operation S330, the storage device may determine whether or not the read command has a special priority based on the PCIe requester information. For example, the storage device may determine whether or not the read command has a special priority based on the PCIe requester ID. When the storage device determines that the read command has a special priority (YES branch from operation S330), operation S340 may be performed. On the other hand, when the storage device determines that the read command does not have a special priority (NO branch from operation S330), operation S350 may be performed.

In operation S340, the storage device may perform a high-speed read operation. The high-speed read operation may refer to an operation of reading data stored in the nonvolatile memory by increasing a resource usage amount of the storage device compared to a normal read operation. The storage device may reduce the time required for reading the data stored in the nonvolatile memory by increasing the resource usage amount.

In operation S350, the storage device may perform a normal read operation. The normal read operation may read data stored in the nonvolatile memory with a smaller resource usage amount than the high-speed read operation.

Figure 9:
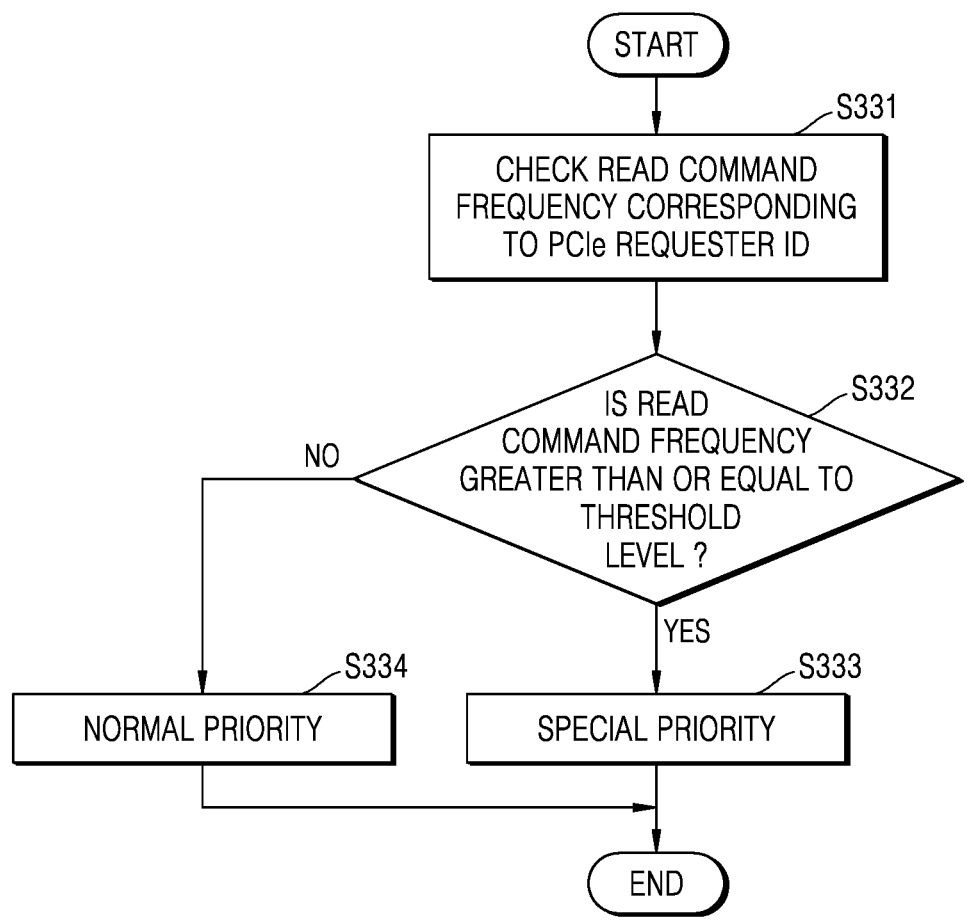
FIG. 9 is a view for describing an operating method of a storage device for determining resource priorities according to some example embodiments.

FIG. 9 is a view for describing an operating method of a storage device for determining resource priorities according to some embodiments.

FIG. 9 may refer to an example embodiment of operation S330 of FIG. 8. Referring to FIG. 9, the operating method of a storage device may include operations S331 to S334.

In operation S331, the storage device may check a read command frequency corresponding to the PCIe requester ID. Specifically, the storage device may check how often the read command has been received with the PCIe requester ID.

In operation S332, the storage device may check whether or not the read command frequency of operation S331 is greater than or equal to a threshold level. When the read command frequency is greater than or equal to the threshold level (YES branch from operation S332), operation S333 may be performed, and when the read command frequency is less than the threshold level (NO branch from operation S332), operation S334 may be performed. The threshold level may be set differently in different example embodiment. The storage device may set the threshold level considering the number of requesters, a total read command number, a read command frequency for each requester, or the like. When the read command frequency is greater than or equal to the threshold level, operation S333 may be performed. On the other hand, when the read command frequency is less than the threshold level, operation S334 may be performed.

In operation S333, the storage device may determine that the read command has a special priority.

In operation S334, the storage device may determine that the read command has a normal priority.

Figure 10:
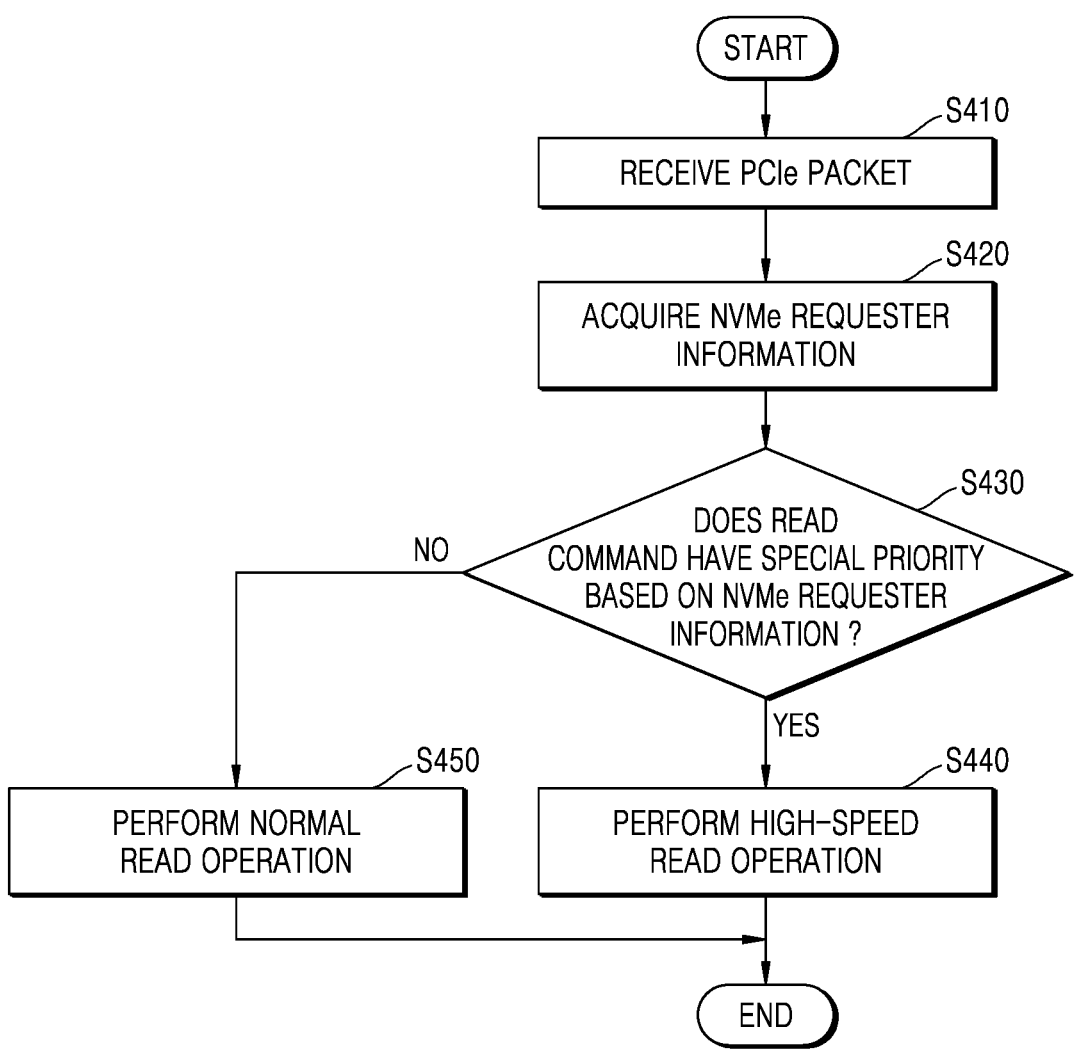
FIG. 10 is a view for describing an operating method of a storage device according to some example embodiments.

FIG. 10 is a view for describing an operating method of a storage device according to some example embodiments.

The operating method of the storage device may include operations S410 to S450. For example, the operating method according to some embodiments may include operations performed in time series in the storage device 10 of FIG. 1.

In operation S410, the storage device may receive a PCIe packet from a host. The storage device may receive the PCIe packet through a channel that follows the PCIe protocol.

In operation S420, the storage device may acquire NVMe requester information based on the PCIe packet. The NVMe requester information may include a requester type and an NVMe requester ID.

In operation S430, the storage device may determine whether or not the read command has a special priority based on the NVMe requester information. For example, the storage device may determine whether or not the read command has a special priority based on the NVMe requester ID. When the storage device determines that the read command has a special priority (YES branch from operation S430), operation S440 may be performed. On the other hand, when the storage device determines that the read command does not have a special priority (NO branch from operation S430), operation S450 may be performed.

In operation S440, the storage device may perform a high-speed read operation. The high-speed read operation may refer to an operation of reading data stored in the nonvolatile memory by increasing a resource usage amount of the storage device compared to a normal read operation.

In operation S450, the storage device may perform a normal read operation. The normal read operation may read data stored in the nonvolatile memory with a smaller resource usage amount than the high-speed read operation.

Figure 11:
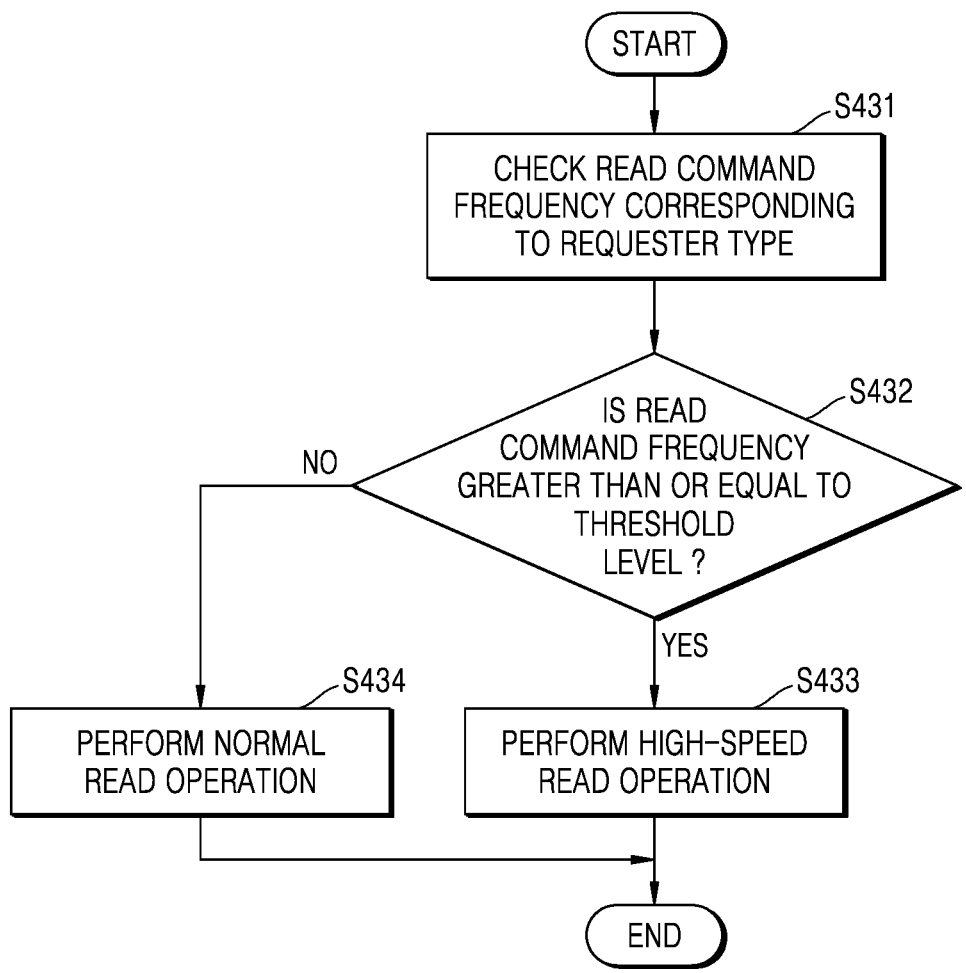
FIG. 11 is a view for describing an operating method of a storage device for determining resource priorities according to some example embodiments.

FIG. 11 is a view for describing an operating method of a storage device for determining resource priorities according to some example embodiments.

FIG. 11 may refer to an example embodiment of operation S430 of FIG. 10. Referring to FIG. 11, the operating method of the storage device may include operations S431 to S434.

In operation S431, the storage device may check a read command frequency corresponding to the requester type. Specifically, the storage device may check how often the read command has been received with the requester type.

In operation S432, the storage device may check whether or not the read command frequency of operation S431 is greater than or equal to a threshold level. When the read command frequency is greater than or equal to the threshold level (YES branch from operation S432), operation S433 may be performed, and when the read command frequency is less than the threshold level (NO branch from operation S432), operation S434 may be performed. The threshold level may be set differently depending on an embodiment. The storage device may set the threshold level considering the number of requester types, a total read command number, a read command frequency for each requester type, or the like. For example, when the GPU has the highest read command frequency, the storage device may determine that a read command of the GPU has a special priority. When the read command frequency is greater than or equal to the threshold level, operation S433 may be performed. On the other hand, when the read command frequency is less than the threshold level, operation S434 may be performed.

In operation S433, the storage device may determine that the read command has a special priority and that a high-speed read operation is to be performed (e.g., operation S440 of FIG. 10).

In operation S434, the storage device may determine that the read command has a normal priority and that a normal read operation is to be performed (e.g., operation S450 of FIG. 10).

Figure 12:
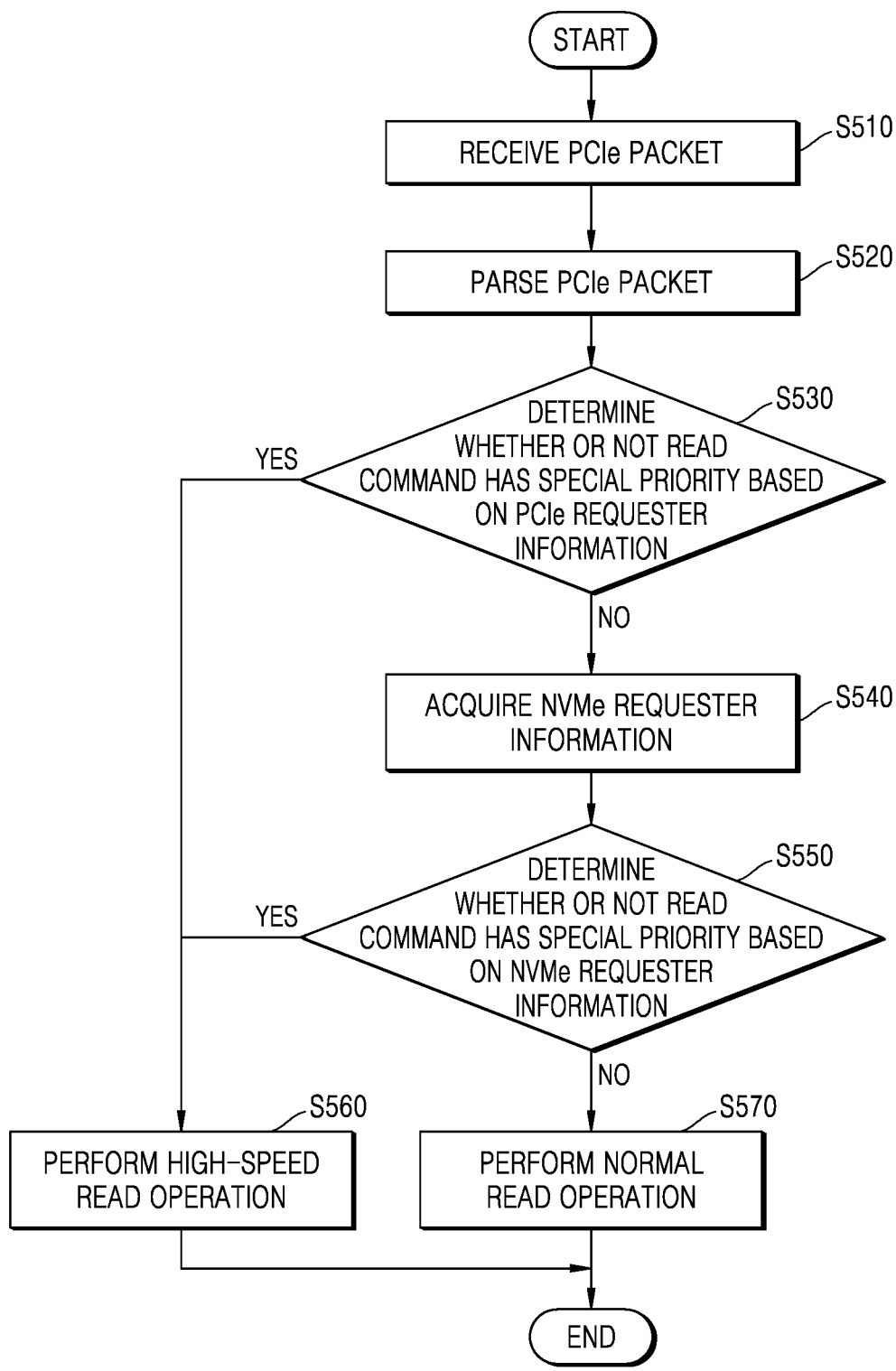
FIG. 12 is a view for describing an operating method of a storage device according to some example embodiments.

FIG. 12 is a view for describing an operating method of a storage device according to some example embodiments.

FIG. 12 may be a case in which resource priorities of a read command are determined considering both PCIe requester information and NVMe requester information.

Referring to FIG. 12, the operating method of the storage device may include operations S510 to S570. For example, the operating method according to some embodiments may include operations performed in time series in the storage device 10 of FIG. 1.

In operation S510, the storage device may receive a PCIe packet from a host. The storage device may receive the PCIe packet through a channel that follows the PCIe protocol.

In operation S520, the storage device may parse or decode the PCIe packet. The storage device may acquire PCIe requester information by parsing or decoding the PCIe packet. The PCIe requester information may include a PCIe requester ID, for example.

In operation S530, the storage device may determine whether or not the read command has a special priority based on the PCIe requester information. For example, the storage device may determine whether or not the read command has a special priority based on the PCIe requester ID. When the storage device determines that the read command has a special priority (YES branch from operation S530), operation S560 may be performed. On the other hand, when the storage device determines that the read command does not have a special priority (NO branch from operation S530), operation S540 may be performed.

In operation S540, the storage device may acquire NVMe requester information based on the PCIe packet. The NVMe requester information may include a requester type and an NVMe requester ID.

In operation S550, the storage device may determine whether or not the read command has a special priority based on the NVMe requester information. For example, the storage device may determine whether or not the read command has a special priority based on the NVMe requester ID. When the storage device determines that the read command has a special priority (YES branch from operation S550), operation S560 may be performed. On the other hand, when the storage device determines that the read command does not have a special priority (NO branch from operation S550), operation S570 may be performed.

In operation S560, the storage device may perform a high-speed read operation. The storage device may reduce the time required for reading the data stored in the nonvolatile memory by increasing the resource usage amount.

In operation S570, the storage device may perform a normal read operation. The normal read operation may read data stored in the nonvolatile memory with a smaller resource usage amount than the high-speed read operation.

Figure 13:
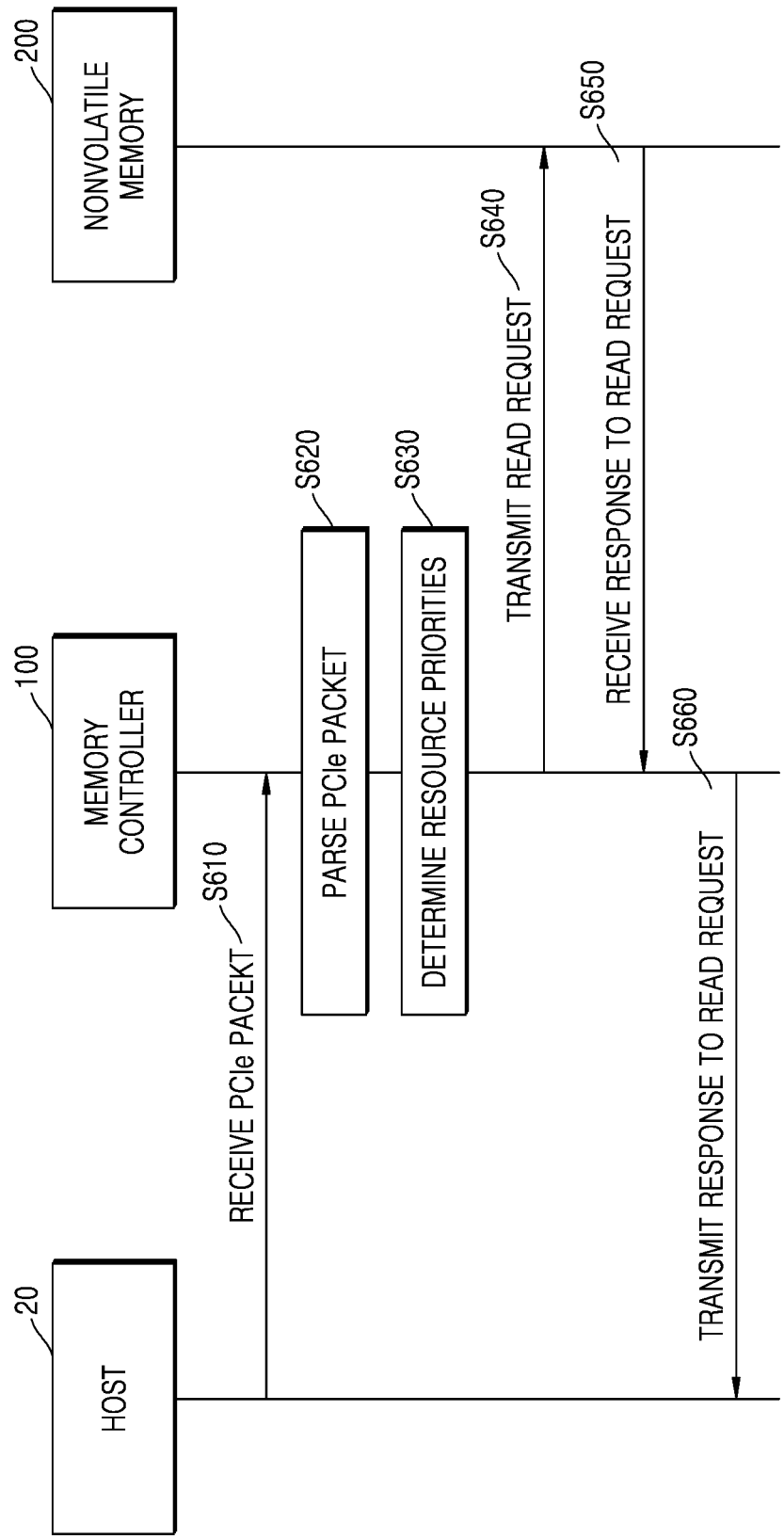
FIG. 13 is a signal exchange diagram between a host, a memory controller, and nonvolatile memory according to some example embodiments.

FIG. 13 is a signal exchange diagram between a host, a memory controller, and nonvolatile memory according to some example embodiments.

The signal exchange diagram of FIG. 13 may be described through an operation of the host 20, the memory controller 100, and the nonvolatile memory 200.

In operation S610, the memory controller 100 may receive a PCIe packet from the host 20. The PCIe packet may include a read command.

In operation S620, the memory controller 100 may parse the PCIe packet. The memory controller 100 may parse the PCIe packet to acquire PCIe requester information.

In operation S630, the memory controller 100 may determine resource priorities of read commands. In some embodiments, the memory controller 100 may determine whether or not the read command has a special priority based on the PCIe requester information.

In some embodiments, operation S630 may further include acquiring NVMe requester information based on the PCIe packet. The memory controller 100 may determine whether or not the read command has a special priority based on the NVMe requester information. For example, when the NVMe requester information includes priority information, the memory controller 100 may determine resource priorities of read commands according to priority information.

In operation S640, the memory controller 100 may transmit a read request to the nonvolatile memory 200.

In operation S650, the memory controller 100 may receive a response to the read request from the nonvolatile memory 200.

In operation S660, the memory controller 100 may transmit a response to the read request to the host 20.

Figure 14:
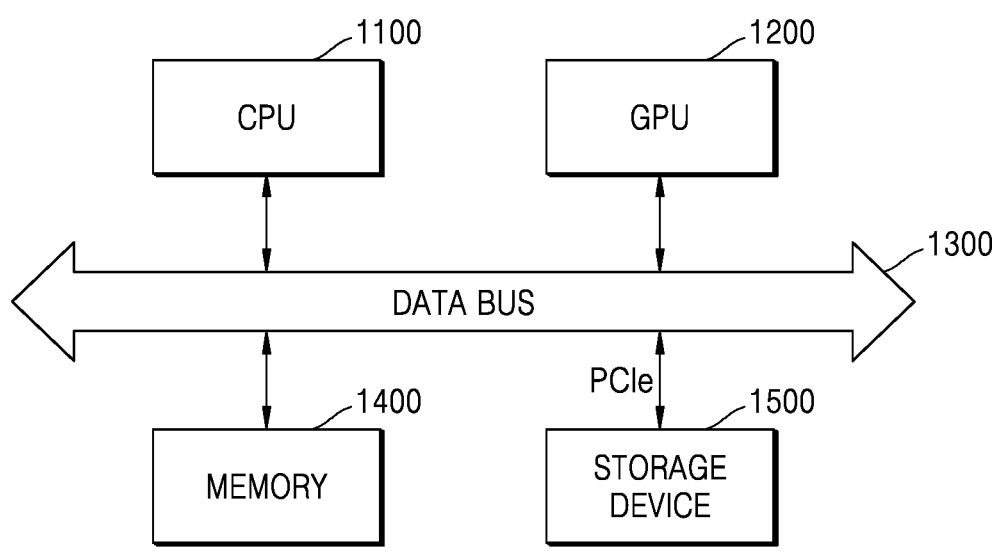
FIG. 14 is a block diagram illustrating an electronic system according to some example embodiments.

FIG. 14 is a block diagram illustrating an electronic system according to some example embodiments.

The electronic system of FIG. 14 may include a CPU 1100, a GPU 1200, a data bus 1300, a memory 1400, and a storage device 1500.

The CPU 1100 may control the overall operation of the electronic system, and more particularly, may control the operations of other components that constitute the electronic system. The CPU 1100 may be implemented as a general purpose processor, a dedicated processor, an application processor, or the like.

The GPU 1200 may refer to a processor that performs graphic processing, simulation, image processing, deep learning, and the like of the electronic system. Like the CPU 1100, the GPU 1200 may be implemented as a general purpose processor, a dedicated processor, an application processor, or the like.

The data bus 1300 may refer to a transmission line for data transmission/reception between the components of the electronic system.

The memory 1400 may be used as a main memory unit of the electronic system.

The storage device 1500 may communicate through the data bus 1300 according to the PCIe protocol. The storage device 1500 may receive a read command from a requester such as the CPU 1100, the GPU 1200, or the like. The storage device 1500 may adjust resource priorities according to the requester. In some embodiments, the electronic system may further include an external device, and the storage device 1500 may receive the read command from the external device.

Figure 15:
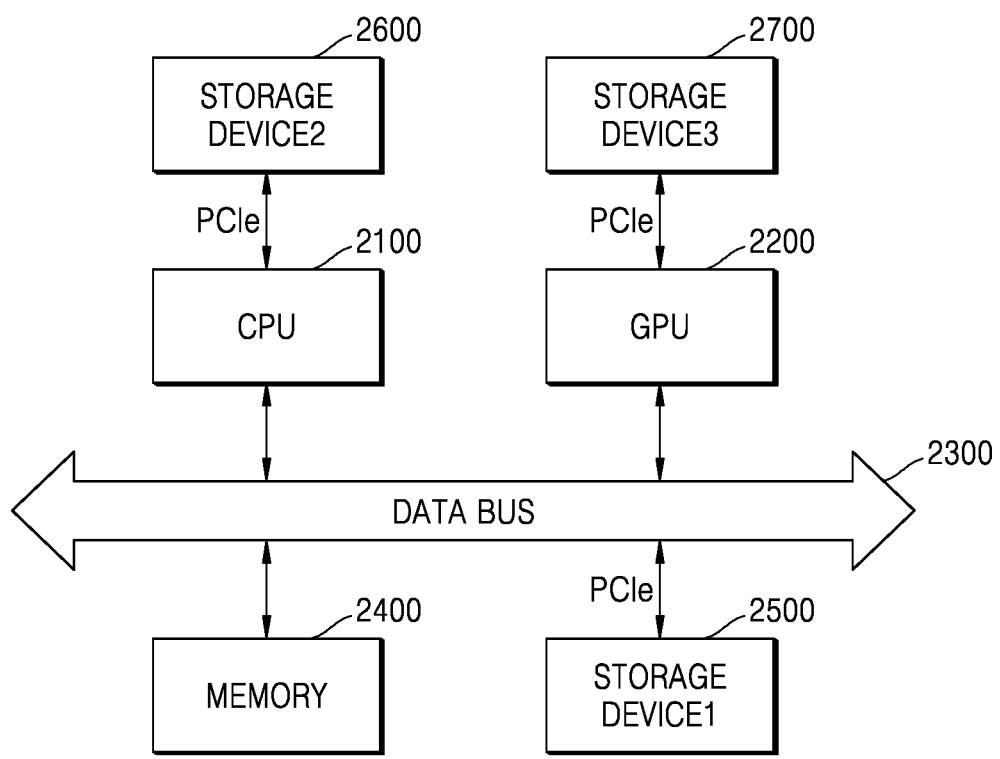
FIG. 15 is a block diagram illustrating an electronic system according to some example embodiments.

FIG. 15 is a block diagram illustrating an electronic system according to some example embodiments.

The electronic system of FIG. 15 may include a CPU 2100, a GPU 2200, a data bus 2300, a memory 2400, a first storage device 2500, a second storage device 2600, and a third storage device 2700.

The electronic system of FIG. 15 may include the second and third storage devices 2600 and 2700 directly connected to requesters (e.g., CPU 2100 and GPU 2200) through the PCIe protocol, unlike in FIG. 14. For example, the second storage device 2600 may be directly connected to the CPU 2100 through the PCIe protocol, and the third storage device 2700 may be directly connected to the GPU 2200 through the PCIe protocol. Each of the second storage device 2600 and the third storage device 270 may receive the read command from the directly connected requesters or the requesters connected via the data bus 2300, and may adjust resource priorities according to the requesters.

Figure 16:
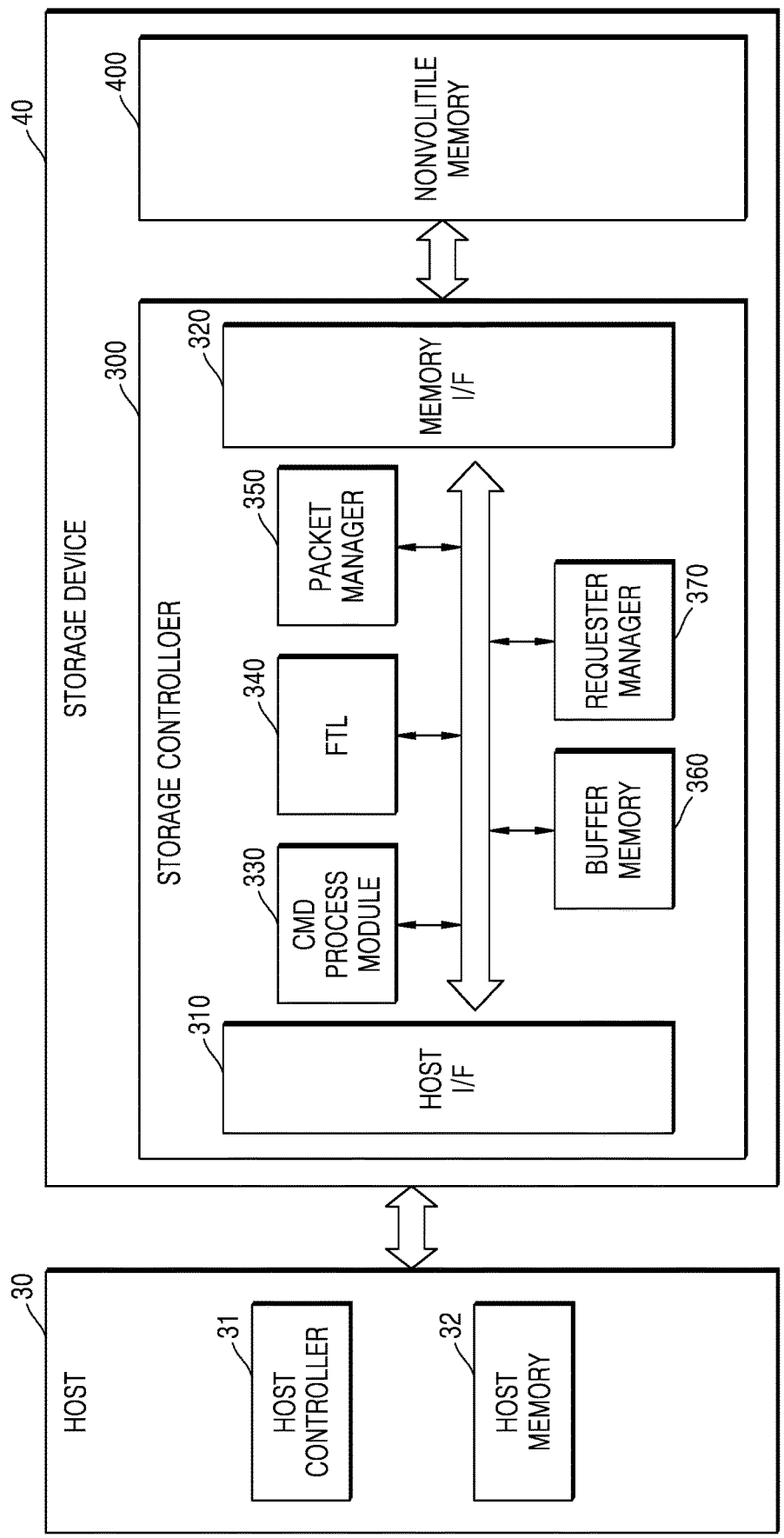
FIG. 16 is a block diagram for describing a host-storage system according to some example embodiments.

FIG. 16 is a block diagram for describing a host-storage system according to some example embodiments.

The host-storage system may include a host 30 and a storage device 40. Also, the storage device 40 may include a storage controller 300 and a nonvolatile memory 400. Also, according to some example embodiments, the host 30 may include a host controller 31 and a host memory 32. The host memory 32 may function as a buffer memory for temporarily storing data to be transmitted to the storage device 40 or data transmitted from the storage device 40.

The storage device 40 may include storage media for storing data according to a request from the host 30. In some embodiments, the storage device 40 may include at least one of an SSD, an embedded memory, and a detachable external memory. When the storage device 40 is an SSD, the storage device 40 may be a device that follows the PCIe or NVMe standard. When the storage device 40 is an embedded memory or an external memory, the storage device 40 may be a device that follows an universal flash storage (UFS) or an embedded multi-media card (eMMC) standard. Each of the host 30 and the storage device 40 may generate a packet according to each employed standard protocol and transmit the packet.

When the nonvolatile memory 400 of the storage device 40 includes flash memory, the flash memory may include a 2D NAND memory array or a three-dimensional (3D) or vertical NAND memory. In another example, the storage device 40 may include various types of nonvolatile memories. For example, the storage device 40 may include Magnetic Ferroelectric RAM (MRAM), Spin Transfer Torque MRAM, Conductive Bridging RAM (CBRAM), Ferroelectric Ferroelectric (FePRAM), a Phase Ferroelectric RAM (PRAM), Resistive Memory (Resistive RAM), and various other types of memories.

According to some example embodiments, the host controller 31 and the host memory 32 may be implemented with an additional semiconductor chip. Alternatively, in some embodiments, the host controller 31 and the host memory 32 may be integrated into the same semiconductor chip. In an example, the host controller 31 may be one of a plurality of modules provided in the application processor, and the application processor may be implemented as a system on chip (SoC). Alternatively, the host memory 32 may be an embedded memory provided in the application processor, or a nonvolatile memory or memory module disposed outside the application processor.

The host controller 31 may store data (e.g., write data) in a buffer region in the nonvolatile memory 400, or may manage an operation of storing data (e.g., read data) of the nonvolatile memory 400 in the buffer region.

The storage controller 300 may include a host interface 310, a memory interface 320, and a command processing module 330. Also, the storage controller 300 may further include a flash translation layer (FTL) 340, a packet manager 350, a buffer memory 360, a command processing module 330, and a requester manager 370. The storage controller 300 may further include a working memory (not shown) into which the FTL 340 is loaded, and the command processing module 330 may perform the FTL 340 so that data writing and reading operations on the nonvolatile memory 400 may be controlled.

The host interface 310 may transmit/receive a packet to/from the host 30. The packet transmitted to the host interface 310 from the host 30 may include a command or data to be written into the nonvolatile memory 400, and the packet transmitted to the host 30 from the host interface 310 may include a response to the command or data read from the nonvolatile memory 400. The memory interface 320 may transmit data to be written into the nonvolatile memory 400 to the nonvolatile memory 400, or may receive data read from the nonvolatile memory 400. The memory interface 320 may be implemented to comply with a standard regulation, such as toggle or ONFI.

The FTL 340 may perform various functions such as address mapping, wear-leveling, garbage collection, or the like. An address mapping operation may be an operation of converting a logical address received from the host into a physical address used to actually store data in the nonvolatile memory 400. Wear-leveling may be a technology for preventing excessive deterioration of a particular block so that blocks in the nonvolatile memory 400 may be uniformly used, and may be implemented through a firmware technology for balancing erase counts of physical blocks. Garbage collection may be a technology for securing available capacity in the nonvolatile memory 400 by using a method of erasing an existing block after copying valid data of a block to a new block.

The packet manager 350 may generate a packet according to a protocol of an interface negotiated with the host 30, or may parse various pieces of information from a packet received from the host 30. Also, the buffer memory 360 may store data to be written into the nonvolatile memory 400 or data to be read from the nonvolatile memory 400. The buffer memory 360 may be a component provided in the storage controller 300, but may be disposed outside the storage controller 300.

The command processing module 330 may include a cache, a processor, or the like for processing the read command received from the host. The command processing module 330 may control the memory controller so as to read data stored in the nonvolatile memory 400 by using resources of the storage device 10 according to resource priorities. Also, the command processing module 330 may acquire NVMe requester information based on the PCIe packet.

The requester manager 370 may determine resource priorities for read command processing based on the PCIe requester information obtained by parsing the packet.

While the inventive concepts of the present disclosure have been particularly shown and described with reference to some examples of embodiments thereof, it will be understood that various changes in form and details may be made therein without departing from the scope of the following claims.

What is claimed is:

1. A method of operating a storage device, comprising:
   receiving a first packet including a read command from a host, according to a first protocol;
   acquiring first requester information corresponding to a host identifier of the host by parsing the first packet;
   determining resource priorities based on the first requester information;
   reading data stored in a nonvolatile memory by using resources of the storage device according to the resource priorities; and
   transmitting the data to the host;
   wherein the first protocol comprises a Peripheral Component Interconnect express (PCIe) protocol, and the first requester information comprises PCIe requester information;
   wherein the PCIe requester information comprises a PCIe requester identifier corresponding to the host identifier according to the PCIe protocol, and
   wherein the determining of resource priorities based on the first requester information comprises determining the resource priorities according to a read command frequency corresponding to the PCIe requester identifier.

2. The operating method of claim 1, wherein the determining of resource priorities based on the first requester information comprises determining the resource priorities as a special priority when the read command frequency corresponding to the PCIe requester identifier is greater than or equal to a threshold level.

3. The operating method of claim 1, wherein the determining of resource priorities based on the first requester information comprises determining the resource priorities as a normal priority when the read command frequency corresponding to the PCIe requester identifier is less than a threshold level.

4. The operating method of claim 1, further comprising receiving a second packet subsequent to the first packet, wherein the determining of resource priorities based on the first requester information comprises determining that a second resource priority corresponding to the second packet is higher than a first resource priority corresponding to the first packet.

5. The operating method of claim 1, further comprising:
   acquiring Non Volatile Memory express (NVMe) requester information including an NVMe identifier corresponding to the host identifier and a requester type corresponding to a type of the host according to an NVMe protocol, based on the first packet; and determining the resource priorities based on the NVMe requester information.

6. The operating method of claim 5, wherein the NVMe requester information further comprises priority information, and wherein the determining of the resource priorities based on the NVMe requester information comprises determining the resource priorities according to the priority information.

7. A storage device configured to communicate with a host according to a first protocol, the storage device comprising:
a nonvolatile memory in which data is stored; and
a memory controller configured to control the nonvolatile memory,
wherein the memory controller comprises:
a media access module configured to transmit/receive the data to/from the nonvolatile memory;
a first protocol layer configured to receive a first packet including a read command for the nonvolatile memory from the host and to acquire first requester information corresponding to a host identifier of the host by parsing the first packet;
a requester manager configured to determine resource priorities based on the first requester information; and
a command process module configured to control the media access module to read data stored in the nonvolatile memory by using resources of the storage device according to the resource priorities, said command process module comprising a command priority manager configured to acquire Non Volatile Memory express (NVMe) requester information including an NVMe identifier corresponding to the host identifier and a requester type corresponding to a type of the host according to an NVMe protocol, based on the first packet; and
wherein the requester manager is further configured to determine the resource priorities based on the NVMe requester information.

8. The storage device of claim 7, wherein the first protocol comprises a Peripheral Component Interconnect express (PCIe) protocol, and wherein the first requester information comprises PCIe requester information.

9. The storage device of claim 8, wherein the PCIe requester information comprises a PCIe requester identifier corresponding to the host identifier according to the PCIe protocol, and the requester manager comprises:
a PCIe requester analyzer configured to detect a read command frequency corresponding to the PCIe requester identifier; and
a requester priority manager configured to determine the resource priorities according to the read command frequency.

10. The storage device of claim 9, wherein the requester priority manager is configured to determine the resource priorities as a special priority when the read command frequency corresponding to the PCIe requester identifier is greater than or equal to a threshold level.

11. The storage device of claim 7, wherein the NVMe requester information further comprises priority information, and wherein the requester manager determines the resource priorities according to the priority information.

12. The storage device of claim 7, wherein the requester manager comprises:
an NVMe requester analyzer configured to detect a read command frequency corresponding to the requester type; and
a requester priority manager configured to determine the resource priorities according to the read command frequency.

13. A host-storage system comprising:
a host configured to generate a first packet including a read command according to a first protocol; and
a storage device configured to receive a first packet from the host, to acquire first requester information corresponding to a host identifier of the host by parsing the first packet, to determine resource priorities based on the first requester information, to read data by using resources according to the resource priorities, and to transmit the data to the host; and
wherein the storage device is configured to acquire NVMe requester information including an NVMe ID corresponding to an ID of the host and a requester type corresponding to a type of the host according to an NVMe protocol, based on the first packet and to determine the resource priorities based on the NVMe requester information.

14. The host-storage system of claim 13, wherein the host is configured to check whether or not the storage device supports a priority change function, and to generate a first packet further including priority information according to a result of determining that the storage device supports the priority change function.

15. The host-storage system of claim 14, wherein the host is further configured to verify whether or not the host supports the priority change function based on an identify command response received from the storage device, in response to a identify command.

16. The host-storage system of claim 13, wherein the first protocol comprises a Peripheral Component Interconnect express (PCIe) protocol, and wherein the first requester information comprises PCIe requester information.

* * * * *